Aug. 25, 1970 W. L. SMITH 3,525,944

FREQUENCY DISCRIMINATOR CIRCUIT

Original Filed Aug. 4, 1967 4 Sheets-Sheet 1

INVENTOR
W. L. SMITH
BY Leo Stanger
ATTORNEY

FREQUENCY DISCRIMINATOR CIRCUIT

Original Filed Aug. 4, 1967 4 Sheets-Sheet 2

United States Patent Office 3,525,944

Patented Aug. 25, 1970

3,525,944

FREQUENCY DISCRIMINATOR CIRCUIT

Warren L. Smith, Allentown, Pa., assignor to Bell Telephone Laboratories, Incorporated, Murray Hill, N.J., a corporation of New York Continuation of application Ser. No. 658,443, Aug. 4, 1967. This application July 25, 1969, Ser. No. 849,239
Int. Cl. H03d 3/26; H01v 7/00
U.S. Cl. 329—140 13 Claims

ABSTRACT OF THE DISCLOSURE

Three pairs of opposing electrodes mounted on a single crystal form a central input resonator coupled to two output resonators. The electrode pairs are sufficiently massive for energy trapping and hence for decreasing the coupling from the input resonator to each output resonator enough to form with each output resonator a low impedance passband. Detector means combine the outputs of the output resonators subtractively to produce a frequency-demodulated output.

This is a continuation of the copending application of W. L. Smith, Ser. No. 658,443 filed Aug. 4, 1967 for Frequency Discriminator Circuit.

REFERENCE TO COPENDING RELATED APPLICATIONS

This application relates to the applications of W. D. Beaver and R. A. Sykes, Case 1–18, Ser. No. 541,549, filed Apr. 11, 1966, and Case 2–19, Ser. No. 558,338, filed June 17, 1966.

BACKGROUND OF THE INVENTION

This invention relates to discriminators for demodulating frequency-modulated waveforms, particularly for demodulating high-frequency radio communication signals modulated over narrow bands such as voice frequency bands.

Such narrow-band, high-frequency operation is desirable in lineless telephone, mobile radio, or other communications to fit as many communication channels as possible into a frequency spectrum. It is readily possible to frequency-modulate waveforms as high as 150 mHz. over the narrow passbands such as 1 kHz. to 15 kHz. needed for voice communication. However, demodulating such frequency-modulated or F.M. signals is difficult and requires complex apparatus. For example, conventionally tuned inductor-capacitor discriminator circuits serve well only at band-widths down to about 1 percent of the input frequency. Thus to utilize the discriminator range fully for voice frequency outputs, high-frequency F.M. waveforms such as 150 mHz. must be frequency-converted in two or more steps to lower, so-called intermediate, frequencies such as 100 kHz. before they are applied to the discriminator. This requires extra complex converter equipment and poses problems of tuning and alignment.

Discriminators using conventional crystal units have achieved passbands as narrow as .01 percent of the input frequency. Such discriminators can operate directly from radio frequency inputs as high as 50 mHz. This eliminates the need for any frequency conversion in many cases with carrier frequencies below 50 mHz. It also eliminates the need for added converted stages with carrier frequencies above 50 mHz. However, such circuits suffer from the need for high load impedances or impedance transformers and careful alignment.

THE INVENTION

According to the invention the deficiencies of past discriminators are eliminated by applying the modulated high frequency input signal to one of three electrode pairs, all deposited with sufficient relative masses on one thickness-mode-cut crystal body so as to make the one pair an input resonator tuned to one frequency and coupled to two output resonators each tuned to a frequency on one side of the input resonator, and by making the electrodes of the different pairs sufficiently massive to achieve energy trapping and thereby decrease the coupling from the input resonator to each output resonator to the point where the output resonators form with the input resonator a separate but overlapping passbands whose image impedances reach respective peaks on either side of the center of the band. Circuit means then detect the outputs of the output resonators and combine them subtractively.

The resulting demodulated output waveform then corresponds to the usual S-curve with a passband determined by the inter-resonator coupling. The lower couplings achieve narrower bands.

As the masses of the electrodes are increased the coupling between adjacent resonators decreases. At the same time, at a particular degree of coupling between adjacent resonators, wave transmission from the input resonator to each output resonator changes in each case from two separate passbands whose image impedances each vary with rising frequencies from zero to infinity, to one passband with image impedances varying from zero to a low impedance and returning to zero in one frequency range and a second passband with image impedances varying from infinity to a high impedance and returning to infinity in a second frequency range. The change occurs abruptly as the coupling decreases. It happens when the coupling between resonators is sufficiently low to overcome the capacitive effect caused by metallic electrodes on opposing faces of the piezoelectric crystal body. This capacitive effect generally is responsible for what is termed the antiresonance.

According to another feature of the invention the high impedance portion of energy passed to the output resonators is substantially eliminated by terminating the discriminator with low impedance loads. The invention furnishes a monolithic crystal device which is capable of providing a simple miniature narrow band discriminator. The terminal impedances of the device are relatively low and frequency adjustment is accomplished in manufacture. Thus no alignment procedures are required for using the discriminator. Such a discriminator is capable of operation with thin film or monolithic silicon circuits for obtaining even smaller size and lower cost.

These and other features of the invention are pointed out in the claims. Other objects and advantages of the invention will become better understood from the following detailed description when read in light of the accompanying drawings.

DESCRIPTION OF PREFERRED EMBODIMENT

Figure 1:
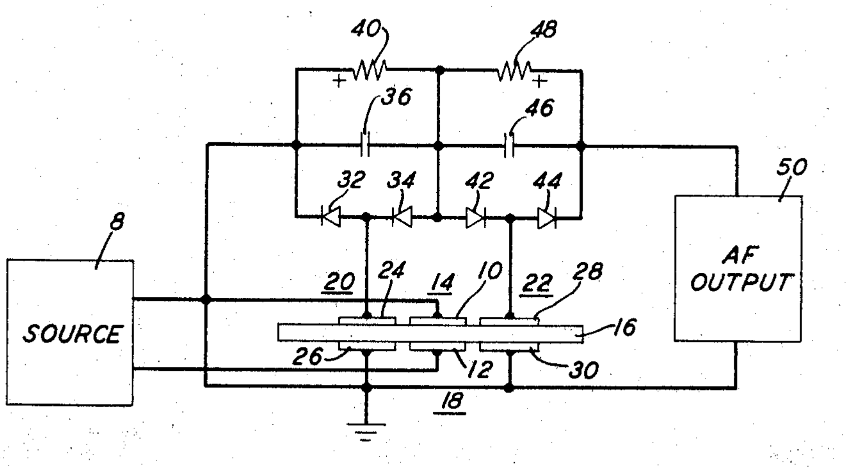
FIG. 1 is a schematic diagram illustrating a discriminator embodying features of the invention.

In FIG. 1 a radio- or intermediate-frequency source 8 furnishes frequency-modulated signals to opposing electrodes 10 and 12 of an electrode pair 14 deposited on opposite surfaces of a quartz crystal body or wafer 16. Together with portions of the crystal wafer 16 the electrodes 10 and 12 form an input resonator 18. The wafer 16 couples the energy supplied to the input resonator 18 by the source 8 to two output resonators 20 and 22. The latter are formed by depositing two electrodes 24 and 26 on opposite faces of the wafer 16 on one side adjacent the resonator 18 and by depositing two more electrodes 28 and 30 on opposite faces of the wafer 16 on the other side adjacent to the resonator 18. The electrode dimensions and masses tune the resonator 20 to a frequency $f_{20}$ below the frequency $f_{18}$ of the input resonator 18, and the resonator 22 to a frequency $f_{22}$ above the frequency $f_{18}$ of resonator 18. Thus energy coupled out of the input resonator 18 to the resonator 20 forms one stagger-tuned passband, and to the resonator 22 forms a second stagger-tuned passband not coinciding with the first.

Two diodes 32 and 34 demodulate the output at the resonator 20. After filtering by a capacitor 36, the demodulated output appears across a load resistor 40. Here the negative portion of the signal at the resistor 40 appears at the ungrounded side. Thus the voltage-frequency transmission response across resistor 40 corresponds to curve A in FIG. 2. A pair of diodes 42 and 44 demodulate the signal appearing at the resonator 22. After filtering by the capacitor 46 the signal appears across the resistor 48 so that the positive side of the resistor 48 appears away from the grounded side. The output voltage-frequency transmission response across the resistor 48 corresponds to the curve B in FIG. 2. The positive and negative voltages across the resistors 40 and 48, because they are added, appear in subtractive relation. A frequency-demodulated output appears across a load 50, between the positive side of resistor 48 and ground. This corresponds to the sum of the curves A and B, and appears as the conventional S-curve response C in FIG. 2.

Figure 3:
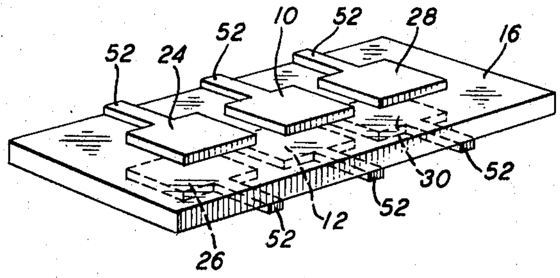
FIG. 3 is a perspective view illustrating with somewhat exaggerated thicknesses the electrode and lead geometry of the crystal structure in FIG. 1.

The electrode geometry of the crystal body 16 and the electrodes 24, 26, 10, 12, 28 and 20 appear in FIG. 3. Leads 52 furnish current paths for the electrodes. The thicknesses of the electrodes, leads and wafer are exaggerated for clarity. The source S supplies energy to the electrodes 10 and 12 near or at the thickness shear mode, or thickness twist mode fundamental frequency of the crystal body 16 depending on the crystal cut. In FIG. 1 an AT-cut crystal wafer 16 is used. Thus the energy piezoelectrically vibrates the body in the thickness shear mode. The vibrations are sensed by the electrodes 24 and 26 as well as the electrodes 28 and 30.

The extent to which the piezoelectrically-induced vibrations in the wafer 16 between the electrodes 10 and 12 couple through the wafer 16 to the output resonators 20 and 22 depends upon the masses of the electrodes and the distances between respective resonators. In FIGS. 1 and 3 the electrodes 10, 12, 24, 26, 28 and 30 are sufficiently massive to create significant energy binding or energy trapping. This mass loading of electrodes concentrates the amplitude of vibrations imposed by the source S in the regions of wafer 16 between the electrodes of each resonator and makes the amplitude of vibration in the wafer 16 drop off exponentially as the distance from each electrode pair increases. The mass loading in FIGS. 1 and 3 is sufficient to decrease the vibration amplitude so that the edges of the body have no significant effect on operation. The mass loading and energy trapping conditions differ from the lightly loaded or unelectroded crystal body. In the latter case the vibration amplitude decreases sinusoidally from a maximum at the point of energy application and is significant over the entire crystal body including the edges. These effects are pointed out in the copending applications of W. D. Beaver and R. A. Sykes previously mentioned.

At the same time, in FIGS. 1 and 3, the distance from the pair of electrodes 10 and 12 to the pair of electrodes 24 and 26 as well as to the pair of electrodes 28 and 30 is such as to place the resonators 18 and 20, and the resonators 18 and 22 in each other's acoustic regions, that is, where they still affect one another signfiicantly so that energy is guided or effectively tunnels between them. However, the distance between the respective electrodes of resonators 20 and 22 is sufficient in view of the mass loading to uncouple these resonators.

The electrodes in FIG. 1 are each sufficiently massive to lower the resonant frequencies of the respective resonators 18, 20 and 22 from the frequency of the fundamental thickness shear or twist mode, whichever is used, of the unelectroded wafer 16, to three consecutive values required for forming the two subtracting passbands. The fractional or percentage lowering of resonant frequency from the fundamental thickness shear or twist mode of an unelectroded wafer by means of mass loading is called plateback. It is a convenient measure of the electrode mass. Where several electrodes are loaded on the body the plateback tends to lower the individual and composite resonant effects along the frequency axis. Platebacks of .3 percent to 3 percent are useful in the environment of FIG. 1. These effects are also pointed out in the copending applications of W. D. Beaver and R. A. Sykes previously mentioned.

The combination of mass loading the electrodes to tune them and create the conditions for reducing the coupling, and the spacing of the resonators to match the degree of mass loading, or of mass loading the electrodes to tune and couple them and accommodate a particular spacing, determines the passbands between the input resonator and each output resonator. This forms the S-curve illustrated in FIG. 2.

The couplings between the input resonator 18 and the respective output resonators 20 and 22 is sufficiently low to overcome the effects of the stray shunt capacitances formed by the metal of the electrodes in each resonator. The couplings are also sufficiently low to narrow the passbands of the individual responses shown by curves A and B to the desired narrow bands, as described in the copending W. D. Beaver and R. A. Sykes applications.

In one embodiment of the invention the components have the following values. Here the discriminator had a center frequency of about 15.040 mHz. Resonators 18, 20 and 22 in the structure were adjusted by sufficient plateback to frequencies of $f_{18}$=15.040 mHz., $f_{20}$=15.035 mHz., and $f_{22}$=15.045 mHz., respectively. Each resonator had an inductance of about 20 mh.

Resistors 40, 48—6.8K
Capacitors 36, 46—200 pf.
Diodes 32, 34, 42, 44—458C
Wafer cut—AT
Thickness of water 16—.0043″
Fundamental thickness shear mode frequency of wafer 16—15.250 mHz.
Material of wafer 16—AT-cut quartz
Plateback of resonator 18—210 kHz. (1.39%)
Plateback of resonator 20—215 kHz. (1.43%)

Figure 4:
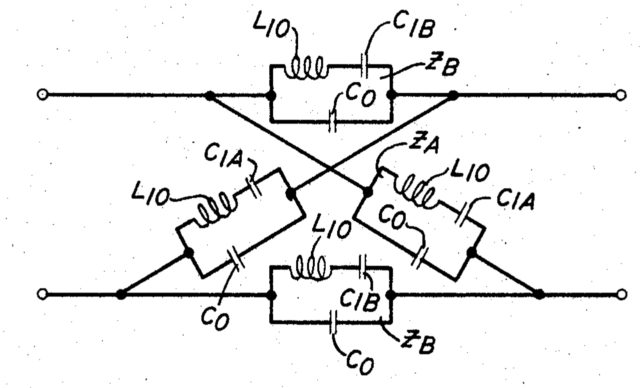
FIGS. 4 and 5 are schematic diagrams of lattice and ladder equivalent networks for portions of the discriminator illustrated in FIG. 1.

Plateback of resonator 22—205 kHz. (1.36%)
Dimensions of electrodes 18, 20 and 22—.052" x .066"
Distances between electrodes—.017"
Load impedance of each path—approx. 1.7K effective
Coupling coefficients between resonators—7.5 x $10^{-4}$ The manner in which the plateback-dependent couplings furnish the desired responses may be appreciated by considering the image impedances afforded by the equivalent network of only two resonators such as the input resonator 18 together with only the output resonator, for example resonator 20, on the wafer 16. Here we assume initially and for simplicity that the resonators 18 and 20 are tuned to the same frequency. For this dual resonator structure, FIG. 4 is the lattice equivalent circuit. The ladder equivalent network is in FIG. 5. In the ladder equivalent circuit of FIG. 5, the three capacitors $C_m$ represent the electrical equivalent of the acoustical coupling between the resonators 18 and 20. The two circuits are related to each other by the following equations:

$$C_{1B}=\frac{C_{10}}{1+\frac{C_{10}}{C_m}}$$

$$C_{1A}=\frac{C_{10}}{1-\frac{C_{10}}{C_m}}$$

The values $C_{10}$ and $L_{10}$ are such that the thickness shear mode fundamental frequency equals $1/2\pi\sqrt{L_{10}C_{10}}$ for each separate uncoupled resonator. The value of $L_{10}$ itself is a function of the thickness of crystal wafer 16 and the geometry of the electrodes 10, 12 and 24, 26. $C_0$ is the capacitance of one pair.

The lattice equivalent circuit is the easier one to analyze. Here, in FIG. 4 when energy is supplied to the electrodes 10 and 12, near or at the thickness shear mode fundamental frequency, and only one output resonator such as resonator 20 is considered the circuit behaves as if composed of two pairs of resonant impedances $Z_A$ and $Z_B$. These impedances are useful for determining the value of the image impedance $Z_I$, which for the lattice structure of FIG. 4 is equal to the square root of $Z_AZ_B$. Since the crystal wafer 16 has a large Q, the values of the impedances $Z_A$ and $Z_B$ are almost exclusively comprised of their reactances $X_A$ and $X_B$. Thus, the image impedance $Z_I$ is equal to the square root of $X_AX_B$.

Figure 6:
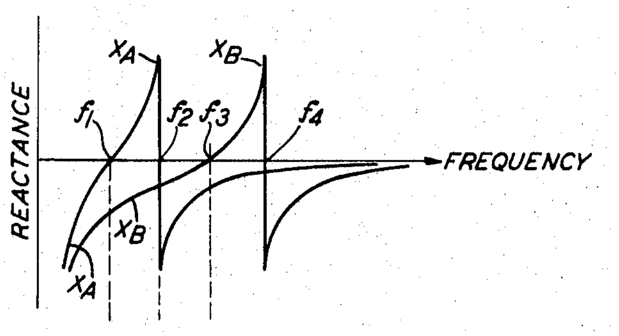
FIGS. 6 and 7 are respective curves illustrating the reactances of the series and diagonal impedances in FIG. 4, and the real portions of the image impedances with respect to frequency imposed by the circuits of FIG. 4, when the electrodes of FIG. 1 have substantially no mass.

In crystal structures having two pairs of electrodes which are not mass-loaded and energy excites the entire crystal body, the reactances $X_A$ and $X_B$ of impedances $Z_A$ and $Z_B$ vary with the frequency as shown in FIG. 6. The reactance $X_A$ varies from a low negative value due to the capacitances in $Z_A$ through zero at a lower resonant frequency $f_1$ when the capacitance $C_{1A}$ resonates with the inductor $L_{10}$. The reactance $X_A$ continues to a high positive value as the inductor $L_{10}$ resonates with both capacitors $C_{1A}$ and $C_0$. At the frequency $f_2$ the reactance change from a high positive inductive value to a high negative capacitive value. This is called the antiresonant frequency $f_2$. As the frequency increases, the prevailing capacitive reactance diminishes to zero. The reactance $X_B$ follows a similar curve with a resonant frequency $f_3$ and an antiresonant frequency $f_4$. The resonant frequencies $f_1$ and $f_3$ are separated by the effect of coupling despite their being tuned to the same frequency when operating in the absence of each other.

Since $X_A$ and $X_B$ are imaginary numbers, that is they are equal to $jX'_A$ and $jX'_B$, their product is negative if they carry a like sign; but positive if they bear opposite signs. The square root of a positive number is real. Thus, in the frequency regions in which $X_A$ and $X_B$ appear on opposite sides of the abscissa, the crystal structure exhibits real positive image impedances $R_I$. These real positive image impedances $R_I$ appear in FIG. 7. They extend respectively across the lower resonant-to-anti-resonant range $f_1$ to $f_2$ and the upper resonant-to-antiresonant range $f_3$ to $f_4$. Depending on the impedances of the load network the crystal structure transfers energy mainly along the real positive image impedance ranges.

Giving the electrodes 10, 12, 24, 26, 28 and 30 sufficient mass concentrates the shear energy in the wafer 16 between the electrodes of the respective resonators 18 and 20 so that the crystal wafer 16 vibrates with greatly diminishing amplitude outside the volume between the electrodes. No significant energy is permitted to reach the boundaries of the wafer 16. Moreover no significant energy reaches the resonator 22 from the resonator 20. Such mass-loading of the plates produces the three separate resonators. Again, only the resonators 18 and 20 are considered and placed in each other's effective vibratory field, they operate similar to a tuned transformer. Controlling their distances and the mass of the electrode pairs regulates the band or spectrum through which the energy of the system of the electrodes 10 and 12 passes to the system of the electrodes 14 and 16. This is the equivalent of controlling the coupling represented by capacitors $C_m$ in FIG. 5.

Figure 5:
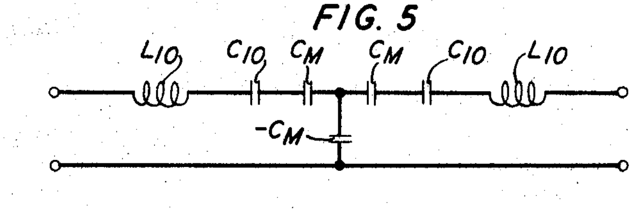
Figure 8:
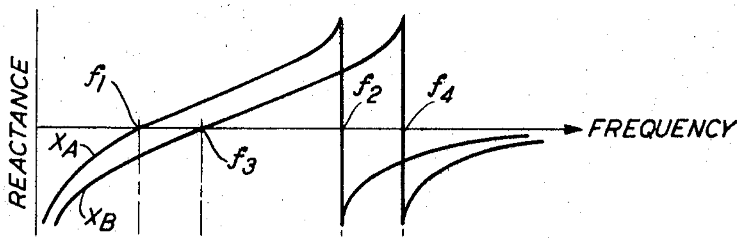
FIGS. 8 and 9 are curves illustrating the reactances of the series and diagonal impedances in FIG. 4, and the real portions of the image impedances with respect to frequency displayed by the circuit of FIG. 4, when the electrodes of FIG. 1 are mass-loaded according to the invention.
Figure 9:
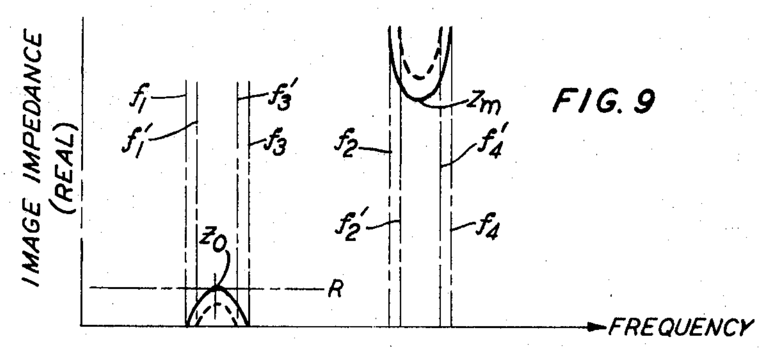

As is seen from FIG. 5, reducing the coupling between the electroded regions increases the value of $C_m$. As a result the ratios $C_{10}/C_m$ decreases in the equations for the values $C_{1B}$ and $C_{1A}$. This increases the denominator for $C_{1A}$ and decreases the denominator for $C_{1B}$. As a result the value of $C_{1A}$ decreases and the value of $C_{1B}$ increases. Thus, the resonant frequencies $f_1$ and $f_3$ approach each other and the frequencies to which each resonator is tuned by its plateback. For simplicity the resonators will be assumed to be tuned by plateback to the same frequency. The resonant frequencies $f_1$ and $f_3$ are made close enough to appear as shown in FIG. 8. Here, the two separate reactances $X_A$ and $X_B$ of impedances $Z_A$ and $Z_B$ follow paths similar to that in FIG. 6. However, the mass-loading and separation make the resonant-to-antiresonant ranges $f_1$ to $f_2$ and $f_3$ to $f_4$ overlap. Now, the resonant frequency $f_3$ in the curve $X_B$ falls between the resonant frequency $f_1$ and the antiresonant frequency $f_2$. The resulting real image impedances $Z_I$ appear in full lines in FIG. 9. Thus the resonators 18 and 20 on the mass-loaded wafer 16 when they are assumed to be equally mass loaded, exhibit the image impedance characteristics shown in FIG. 9. Similar image impedances are formed by coupling resonators 18 to 22. These real image impedances occur in a first frequency band wherein the impedance rises from zero to some small value such as 100 ohms and then returns to zero as the frequency rises, and in a second band wherein the impedance starts at a substantially infinite value, decreases to a minimum and rises to a substantially infinite value again as the frequency increases. This is shown in FIG. 9 by the solid-line curves. Here, the image resistance curve varies from zero to a maximum value $Z_0$ and returns to zero in a frequency band between $f_1$ and $f_3$. In a frequency band between $f_2$ and $f_4$ the resistance value of the image impedance varies from infinity to a minimum $Z_m$ and back to infinity. As the coupling between the resonators is decreased further, the image impedances change to those shown by the dotted curves in the band $f_1'$ to $f_3'$ and $f_2'$ to $f_4'$. If the coupling is small enough, the difference in impedance value between the intermediate maximum $Z_0$ of one band and the intermediate minimum in the other band is several orders of magnitude. FIG. 9 shows a smaller difference for clarity. However it is intended that this represents larger differences as well.

The passband, which arises as a result of terminating the output resonator 20 with any impedance R, approaches the lowest achievable minimum at any frequency that the image impedance matches the terminating impedance. At any frequency, the greater the mismatch the less the transmission. Thus, terminating the output resonator 20 with an impedance R near the image impedance range in one frequency band and remote from the image impedance range in the other band produces a transmission response over the whole frequency spectrum having only high losses in the remote frequency range. This substantially excludes the effect of the remote frequency range.

Figure 7:
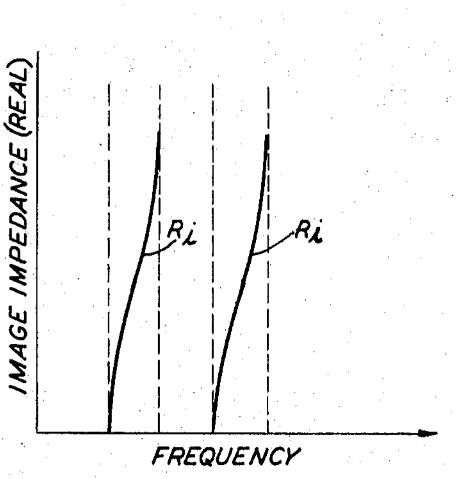

In the case of FIG. 7, no matter what the value of impedance R low losses exist near the frequencies where R crosses $R_1$. Thus at all values of R the transmission response has two bands of low loss separated by a band of high loss.

Figure 2:
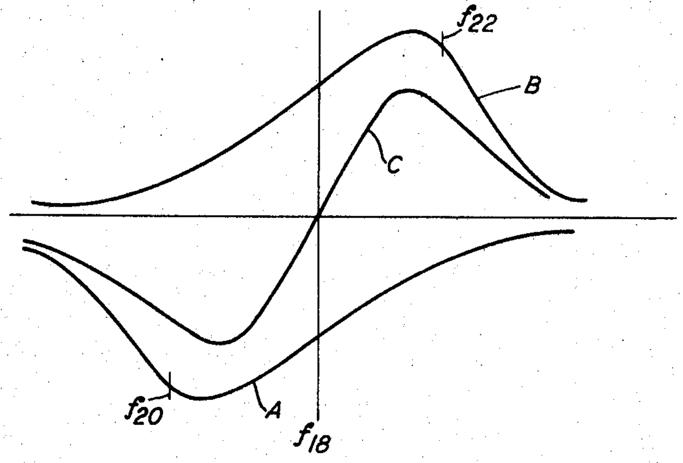
FIG. 2 illustrates the response of the monolithic discriminator illustrated in FIG. 1.
Figures 10, 11:
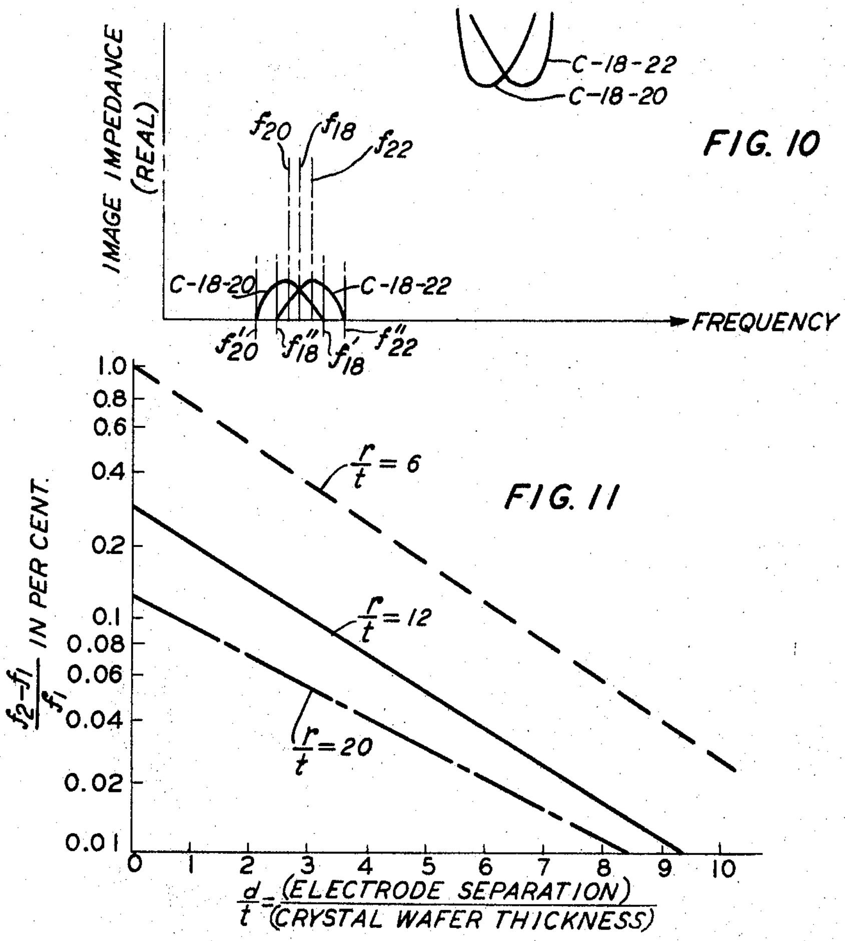
FIG. 10 is an impedance-frequency diagram illustrating the real positive portions of the image impedances for the passbands generated between the input and output resonators in FIG. 1 when considered at the output resonators.
FIGS. 11, 12 and 13 are diagrams relating to relationships between crystal and electrode geometries useful for constructing the discriminator of FIG. 1.

According to the invention the electrodes 10, 12, 24, 26, 28 and 30 are sufficiently massive and spaced far enough so that the resonator 18 forms with the resonator 20 and separately with the resonator 22 image impedance characteristics well in the range illustrated in FIGS. 8 and 9 rather than 6 and 7. They are also sufficiently uncoupled to prevent significant coupling between resonators 20 and 22. However in FIG. 1 the masses of the electrodes are so adjusted that the passbands between resonators 18 and 20 are offset from that of resonators 18 and 22. That is, the plateback of electrodes in resonator 22 are less than resonator 18 and that of resonator 20 more than resonator 18. This is shown in FIG. 10. It shifts the image impedance curve C–18–20 of the coupled resonators 18 and 20, as observed from the output resonator 20, down. It shifts the image impedance curve C–18–22 of the coupled resonators 18 and 22 as observed from the output resonator 22 up the frequency axis. It also distorts the curves' symmetry somewhat. The frequencies $f_{18}$, $f_{20}$, and $f_{22}$ represent the frequencies to which the resonators are tuned in the uncoupled state. When coupled in each case the frequencies separate to the values $f'_{18}$ and $f'_{20}$ for curve C–18–20 and $f''_{18}$ and $f''_{20}$ for curve C–18–22. By effectively terminating the output resonators 20 and 22 with low impedances such as $2Z_0$ the passbands result substantially as shown in FIG. 2. The source 8 also has a low impedance. The effects of the high image impedances between frequencies $f_2$ and $f_4$ are eliminated by the mismatch. The impedance value $2Z_0$ achieves a Gaussian passband.

Figure 12:
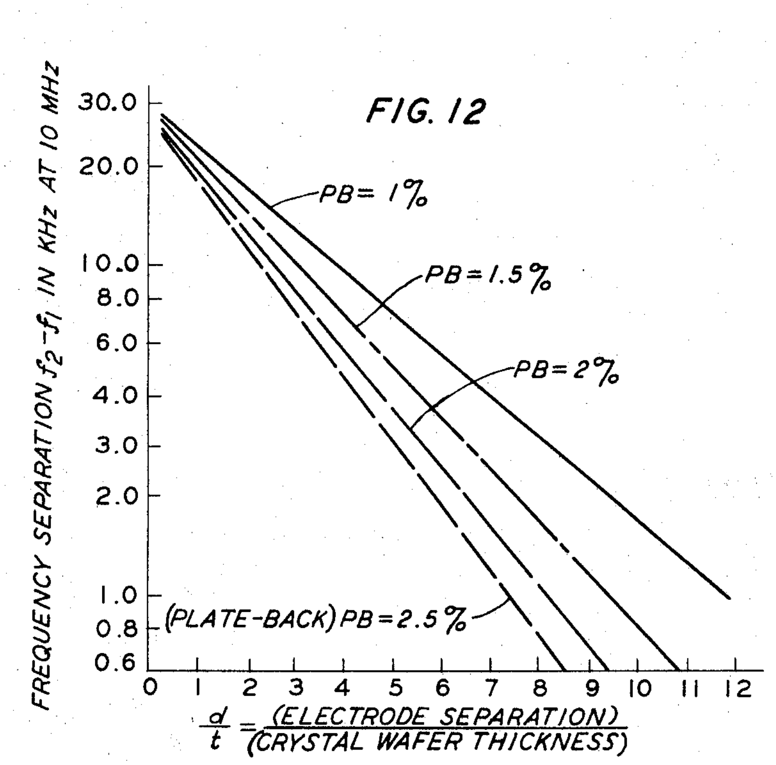
Figure 13:
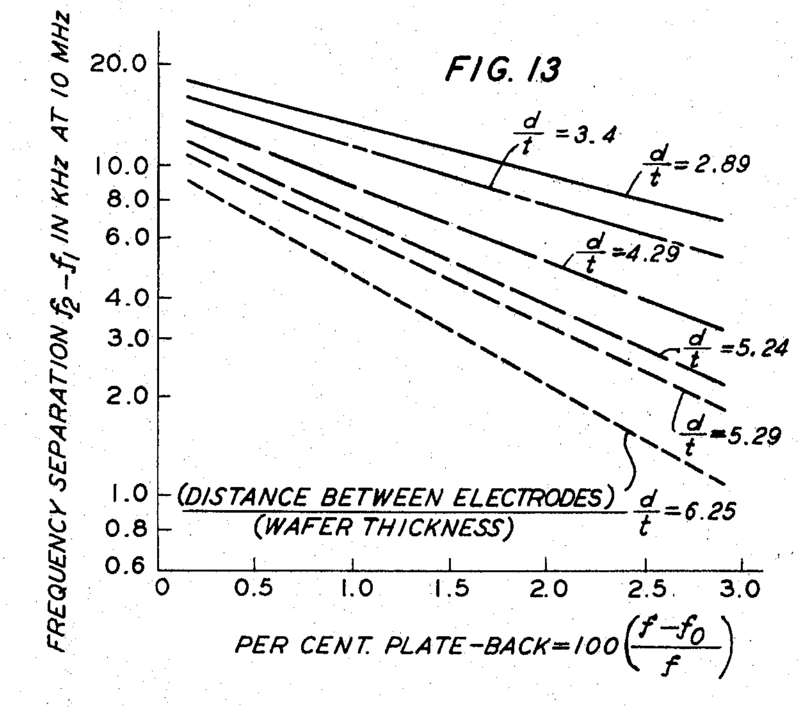

An example of curves for a structure such as CR operating in the fundamental thickness shear mode and useful for constructing the crystal structure of FIG. 1 are shown in FIGS. 11, 12 and 13.

The crystal structure of FIG. 1 is manufactured by first selecting the bandwidths B*w* of each passband A and B about chosen midband frequencies $f_m$ (i.e., approximately $f_{20}$ and $F_{22}$). The bandwidths B*w* are chosen to be equal to the peak-to-peak deviation of the modulated input signal. B*w* must be less than .2% $f_m$ in order to assure operation in the low impedance range of 9. An electrode size and a suitable center electrode 19 plateback (from .3 to 3%), are chosen from the curves in FIGS. 11, 12 and 13. Where $t$ is the plate thickness and $r$ the width of the electrodes $r/t$ is generally made equal to 12 although in practice any value between 6 and 20 is usable. A value of $15t$ is generally chosen as the length of the electrodes normal to the coupling axis for good suppression of other modes. The fundamental thickness shear mode frequency $f$ is determined to correspond to the chosen plateback $P_B$ from the formula $$P_B=\frac{f-f_m}{f}$$

where $f_m=f_{18}$ $$f=\frac{f_m}{1-P_B}$$

The manufacture starts by first cutting a wafer 16 from a quartz crystal having the desired crystallographic orientation such as an AT-cut. The wafer is then lapped and etched to a thickness $t$ corresponding to the desired fundamental shear or twist mode index frequency $f$ in the usual manner. Generally, the thickness is inversely proportional to the desired frequency. Masks are placed on each face of the crystal wafer with cutouts for depositing the six electrodes. The geometry of the electrodes is determined by considering the desired bandwidths and the convenient plateback.

The proper separation $d$ between the electrodes may be determined from the graphs of FIGS. 11, 12 or 13 which show variations in percent bandwidth for various ratios of electrode separation to plate thickness and for various platebacks, as well as various values of $r/t$.

To obtain the chosen platebacks, gold or nickel is deposited such as by electroplating in layers through the masks so as to make connections possible and achieve about half the total desired plateback. Energy is applied to the high frequency electrodes 28 and 30 and mass added to the electrodes until a shift corresponding to the desired total plateback occurs. This is done until the pair resonates at the frequency $f_{22}$. The procedure is repeated for the electrodes 10 and 12 and then 24 and 26. During this procedure for the second and third pairs, it may be necessary to obviate the effect of the first and second pairs by terminating the first and second pairs inductively. The desired bandwidths should then prevail. The responses of the coupled resonator are then calculated or measured to determine the values of $Z_0$ for each pair. The load impedances for each pair are then chosen to be approximately $2Z_0$. This affords a Gaussian response rather than a flat band response for each pair of resonators.

The decoupling is such that the value of $2Z_0$ is still sufficiently remote from the minimum image impedance $Z_m$ in FIG. 9 to effectively eliminate transmission response between the frequencies $f_2$ and $f_4$. Terminating impedances lower than $2Z_0$ also can do this. Thus it may be stated that according to a feature of the invention the coupling between resonators 18 and 20 and between 18 and 22 are sufficiently low, and the input and terminating impedances at the resonators are sufficiently low to achieve but a single passband.

While embodiments of the invention have been described in detail it will be obvious to those skilled in the art that the invention may be otherwise embodied within its spirit and scope.

What is claimed is:

1. A discriminator circuit, comprising an acoustically resonant body, first electrode means mounted on said body and forming with said body input resonator means for responding to a frequency modulated input signal, second and third electrode means each mounted on said body for forming with said body first and second output resonator means coupled acoustically to said input resonator means through said body, said input resonator means being tuned to a center frequency, said output resonator means being tuned to frequencies respectively higher and lower than said center frequency and forming with said input resonator means respective passbands, and circuit means for subtractively combining the outputs of said output resonator means so as to form a demodulated output.

2. A discriminator as in claim 1 wherein said electrode means form capacitive effects which can distort the passbands, said electrode means being spaced relative to each other and having sufficient masses to limit the coupling between resonators to the point where the capacitive effects are overcome.

3. A discriminator as in claim 1 wherein said input electrode means are spaced relative to each of said output electrode means and said electrode means are sufficiently mass loaded, and said circuit means have a sufficiently low impedance, so that at each of said output electrode means there exists but one uninterrupted passband.

4. A discriminator as in claim 1 wherein said electrode means are spaced relative to each other and have sufficient masses to limit the coupling between said resonator means to the point of forming between the input resonator means and each output resonator means a real image impedance-frequency characteristic having a finite intermediate maximum impedance in one frequency range.

5. A discriminator as in claim 1 wherein said electrode means are spaced relative to each other and have sufficient masses to limit the coupling between resonators and to form between the input resonator means and each output resonator means a real image impedance-frequency characteristic in one frequency range having a real finite intermediate maximum impedance and extreme zero impedances.

6. A discriminator as in claim 1 wherein said body has opposing faces and peripheral edges and said electrode means of each resonator means are mounted on opposite faces and spaced from said edges, and wherein said masses determine the frequency to which said resonator means are tuned.

7. A discriminator as in claim 1 wherein said electrode means each include two electrodes opposing each other on opposite sides of said crystal body.

8. A discriminator as in claim 7 wherein connecting means connect an electrode on one side of said body in said input resonator means to electrodes on the other side of said body in said output resonator means.

9. A discriminator as in claim 5 wherein between the input resonator means and each output resonator means a second image impedance range is formed having an intermediate minimum real impedance with extreme infinite real impedances.

10. A discriminator as in claim 4 wherein said circuit means are loaded with resistance means in the range lower than said maximum image impedance.

11. A discriminator circuit comprising input resonator means tuned to a center frequency for responding to a frequency modulated input signal, first output resonator means coupled to said input resonator means and tuned to a frequency above said center frequency for forming with said input resonator means a first passband, second output resonator means tuned to a frequency below said center frequency and coupled to said input resonator means for forming with said input resonator means a second passband, means responding subtractively to said output resonator means for establishing a demodulated output, each of said resonator means having electrode means and a crystal body common to the electrode means of each of said resonator means, said electrode means having masses sufficiently large and being spaced sufficiently to limit the coupling between resonators and form between the input resonator and each output resonator a real image impedance-frequency characteristic with an intermediate finite maximum between two zero values in the low impedance range.

12. A resonant device comprising an acoustically resonant body having edges and a fundamental thickness shear mode frequency, first electrode means mounted on said body away from said edges and forming with said body input resonator means for responding to an electrical signal, second and third electrode means each mounted on said body away from said edges and forming with said body first and second output resonator means coupled acoustically through said body, said electrode means being sufficient to tune said three resonators to respective frequencies different from the fundamental thickness shear mode frequency of said body, said input resonator being tuned to a first frequency, said output resonators being tuned respectively to frequencies higher and lower than said first frequency, said second and third electrode means being spaced from said first electrode means distances so said output resonators form with said input resonator respective passbands, one of which has a higher center frequency than the other, whereby signals applied to said first electrode means over a given frequency spectrum can be separated into two different spectra at said second and third electrode means.

13. A resonant device as in claim 1 wherein said electrode means have sufficient masses to tune said resonators to frequencies below the fundamental thickness mode frequency of said body so that there exists at each of said second and third electrode means when said first electrode means are excited with increasing frequency an image resistance starting at zero increasing to an intermediate finite maximum and decreasing to zero and a second image resistance starting at infinity decreasing to a finite intermediate minimum and increasing to infinity, and wherein said intermediate maximum is less than said intermediate minimum.

References Cited

UNITED STATES PATENTS 2,771,552 11/1956 Lynch ----------- 329—142 X

ROY LAKE, Primary Examiner

L. J. DAHL, Assistant Examiner

U.S. Cl. X.R.

310—9.8; 333—72